(12) United States Patent
Brinkmann et al.

(10) Patent No.: US 9,127,799 B2
(45) Date of Patent: Sep. 8, 2015

(54) FLUID CONDUIT WITH VARIABLE FLOW RESISTANCE

(71) Applicant: FORD GLOBAL TECHNOLOGIES, LLC, Dearborn, MI (US)

(72) Inventors: Bernd Brinkmann, Dormagen (DE); Harald Kaufeld, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 13/851,232

(22) Filed: Mar. 27, 2013

(65) Prior Publication Data
US 2013/0255815 A1 Oct. 3, 2013

(30) Foreign Application Priority Data

Mar. 30, 2012 (DE) .......................... 10 2012 205 262

(51) Int. Cl.
| F16L 55/02 | (2006.01) |
| F16L 55/027 | (2006.01) |
| F15C 3/04 | (2006.01) |
| F15D 1/02 | (2006.01) |
| G05D 7/06 | (2006.01) |

(52) U.S. Cl.
CPC ............. *F16L 55/02727* (2013.01); *F15C 3/04* (2013.01); *F15D 1/025* (2013.01); *F16L 55/027* (2013.01); *G05D 7/0694* (2013.01); *Y10T 137/2213* (2015.04)

(58) Field of Classification Search
CPC ......... F16K 7/04; F16K 7/07; F16K 99/0049; F15D 1/025; F16L 55/027; F16L 55/02727
USPC .................................................. 251/5, 129.06
See application file for complete search history.

(56) References Cited

U.S. PATENT DOCUMENTS

| 2,241,086 | A | * | 5/1941 | Gould .............................. 62/223 |
| 3,441,245 | A | * | 4/1969 | Holland et al. .................... 251/5 |
| 3,442,501 | A | * | 5/1969 | Soderberg .................. 267/64.28 |

(Continued)

FOREIGN PATENT DOCUMENTS

| DE | 3405907 A1 | 8/1985 |
| WO | 2009113020 A1 | 9/2009 |

OTHER PUBLICATIONS

German Patent and Trademark Office, German Search Report for the corresponding German Patent Application No. DE 10 2012 205 262.3 mailed May 7, 2015.

*Primary Examiner* — Matthew W Jellett
(74) *Attorney, Agent, or Firm* — Greg P. Brown; Brooks Kushman P.C.

(57) ABSTRACT

A fluid-carrying conduit achieves variable resistance to flow. An elongate, hollow body casing has at least one chamber containing either a dilatant fluid or an electroactive polymer. In the case of the dilatant fluid, a reduction in an effective flow cross section of the fluid line occurs in reaction to an increase in the shear rate of a fluid flowing through the fluid line. In the case of the electroactive polymer, a reduction in an effective flow cross section of the fluid line occurs in reaction to an electric current being applied to the body casing. The conduit may be configured for use as a degassing line in a cooling system of an internal combustion engine. The conduit may have a reinforcement encircling the electroactive polymer. The conduit may have an electrically conductive connecting surface adjacent to the electroactive polymer. The electroactive polymer may be an ionic electroactive polymer.

5 Claims, 3 Drawing Sheets

(56) References Cited

U.S. PATENT DOCUMENTS

| | | | |
|---|---|---|---|
| 5,309,870 A * | 5/1994 | Ap | 123/41.21 |
| 5,316,261 A * | 5/1994 | Stoner | 251/5 |
| 5,833,382 A * | 11/1998 | Jenks et al. | 401/82 |
| 6,812,624 B1 * | 11/2004 | Pei et al. | 310/309 |
| 7,537,197 B2 * | 5/2009 | Heim et al. | 251/129.06 |
| 7,637,892 B2 | 12/2009 | Steinbach et al. | |
| 2004/0068220 A1 | 4/2004 | Couvillon, Jr. et al. | |
| 2004/0242956 A1 | 12/2004 | Scorvo | |
| 2013/0214183 A1 | 8/2013 | Wilie | |
| 2013/0318962 A1 * | 12/2013 | Joshi et al. | 60/545 |

\* cited by examiner

FLUID CONDUIT WITH VARIABLE FLOW RESISTANCE

CROSS-REFERENCE TO RELATED APPLICATIONS

This application claims foreign priority benefits under 35 U.S.C. §119(a)-(d) to DE 10 2012 205 262.3, filed Mar. 30, 2012, which is hereby incorporated by reference in its entirety.

TECHNICAL FIELD

The invention relates to a variable flow resistance. Although the invention can be used especially advantageously in a degassing line of a cooling system of an internal combustion engine, it can in general be employed in all fluid lines (for example, hose lines) in which a variation in the flow resistance is desirable.

BACKGROUND

Conduits having variable flow resistances are used, for example, in degassing lines of a cooling system for an internal combustion engine of a motor vehicle. Such conduits conventionally have, for example, a valve and a comparatively complex control mechanism. This sometimes proves to be a disadvantage in practice both from the point of view of construction space and weight and in terms of the complexity of the cooling system, for example as regards the electrical connections and control strategy, also, not least, also in respect of the need for movable structural parts or components (inter alia, because of the accompanying wear).

U.S. Pat. No. 7,637,892 B2 discloses an implantable variable infusion pump system which has a flux or flow resistance, for example in the form of a filament fitted into a capillary or of an insertion piece, in which case the insertion piece will be composed of an electroactive polymer.

SUMMARY

In a first disclosed embodiment, a variable flow resistance conduit comprises a fluid line having an elongate, hollow body casing containing a dilatant fluid. The dilatant fluid causes a reduction in an effective flow cross section of the fluid line in reaction to an increase in the shear rate of a fluid flowing through the fluid line.

According to a further embodiment, the the dilatant fluid exhibits an increase in volume under an increasing pressure.

According to a further embodiment, the dilatant fluid is located in at least one chamber formed in the hollow body casing.

According to a further embodiment, dilatant fluid is configured such that the flow of the fluid can be interrupted completely.

According to a further embodiment, conduit is configured for use as a degassing line in a cooling system of an internal combustion engine.

In a second disclosed embodiment, a variable flow resistance conduit comprises a fluid line having an elongate, hollow body casing comprising an electroactive polymer which causes a reduction in an effective flow cross section of the fluid line in reaction to an electric current applied to the body casing.

According to a further embodiment, the hollow body casing comprises at least one chamber filled with the electroactive polymer.

According to a further embodiment, the flow resistance is configured in such a way that the flow of the fluid can be interrupted completely.

According to a further embodiment, the conduit further comprises a reinforcement encircling the electroactive polymer.

According to a further embodiment, the conduit further comprises an electrically conductive connecting surface adjacent to the electroactive polymer.

According to a further embodiment, the electroactive polymer comprises an ionic electroactive polymer.

The invention is thus based, in particular, on the concept of configuring a hollow body forming the fluid line in such a way that a reduction in the effective flow cross section of the fluid line is brought about directly by the material of the hollow body casing itself as a reaction to an increase in the shear rate of a fluid flowing through the fluid line, or as a result of an electrical voltage applied to the hollow body. In both instances, in the variable flow resistance according to the invention, there is no need for any movable components, and therefore the complexity and costs of the set-up are reduced.

BRIEF DESCRIPTION OF THE DRAWINGS

The invention is explained in more detail below by means of preferred embodiments and with reference to the accompanying figures in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
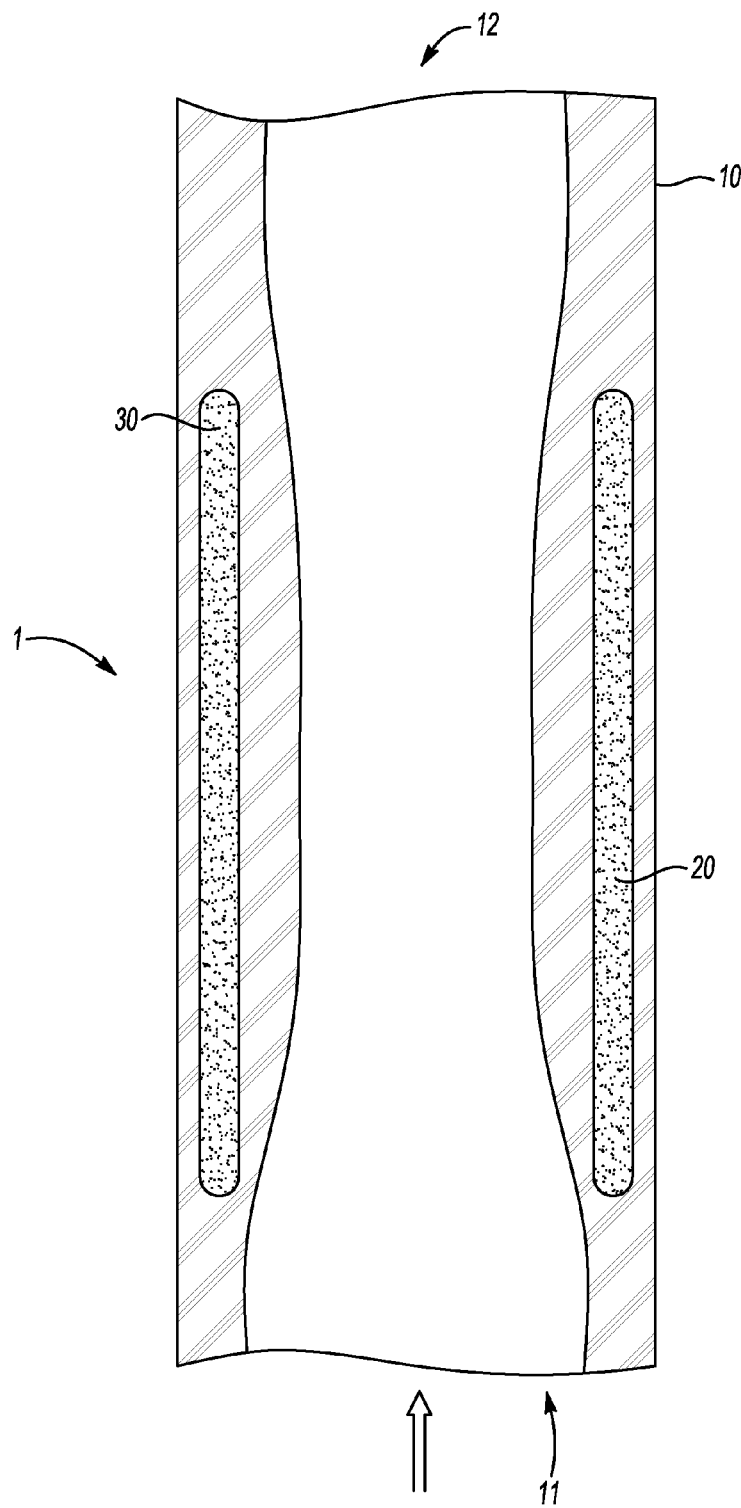
FIGS. 1 and 2 show diagrammatic illustrations to explain the set-up and functioning of a variable flow resistance according to an exemplary embodiment.
Figure 2:
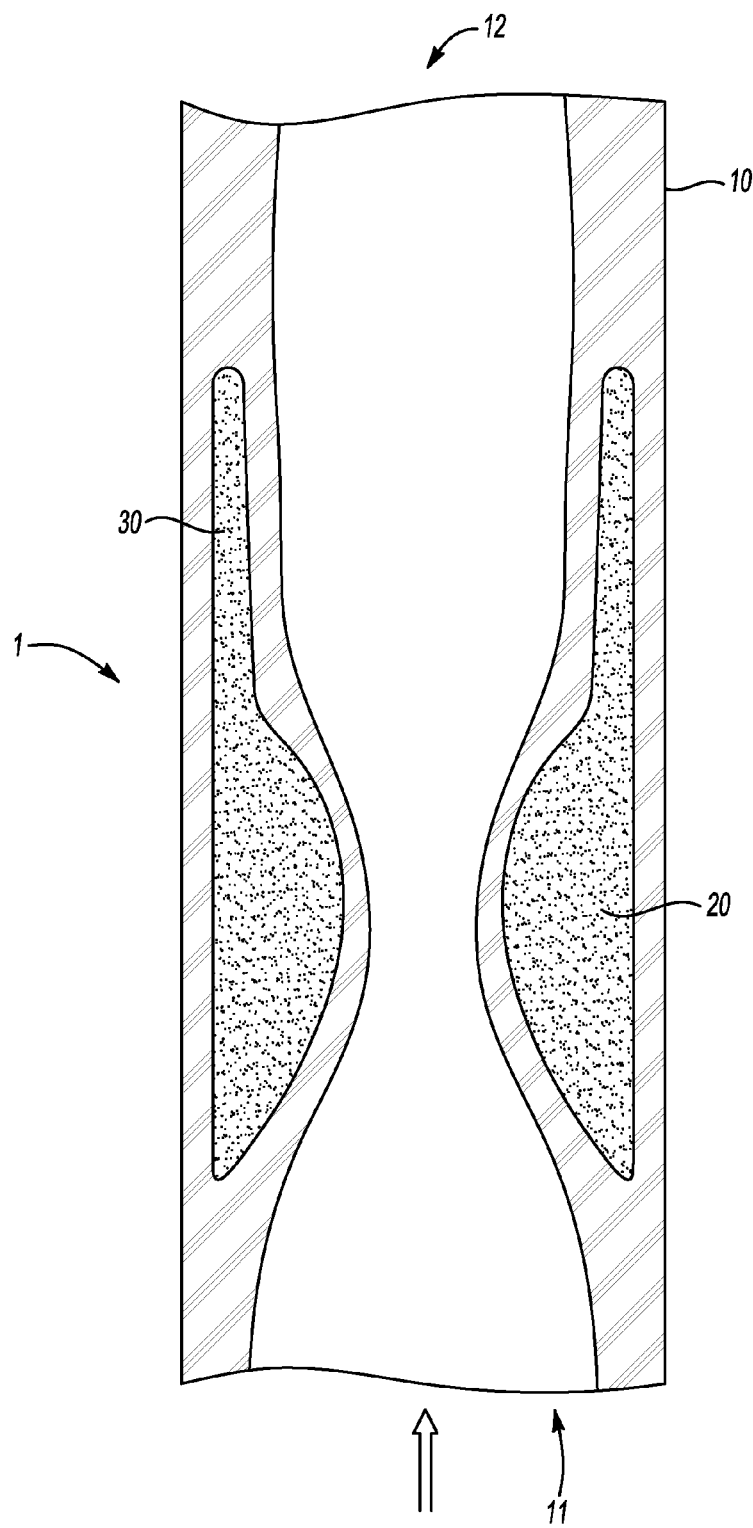

According to FIGS. 1 and 2, in a first embodiment, a fluid line 1 which is designed as an elongate hollow body which connects a fluid inlet 11 to a fluid outlet 12 in a fluid-conducting manner. The elongate hollow body is formed by a hollow body casing 10 which, in the exemplary embodiment illustrated, has a dilatant fluid 20 in at least one chamber 30 formed in the hollow body casing 10.

A dilatant (also termed shear-thickening) material is one in which viscosity increases with the rate of shear strain. Such a shear-thickening fluid is an example of a non-Newtonian fluid and has (in a way known per se) in the case of a growing shear rate, a viscosity increase which is attributable to more pronounced interaction of the fluid particles with one another and to an accompanying structural change in the fluid.

The variable flow resistance may thus be completely self-controlling, in which case in particular (as well as the above-mentioned dispensing with movable components) there is no need for an external control system or a (for example, electrical) actuator. To implement the desired function, the dilatant fluid must not only possess shear-thickening properties, but at the same time also have an increase in volume under an increasing pressure.

The fluid line may be, merely by way of example (and without the invention being restricted to this), a degassing line of a cooling system for an internal combustion engine of a motor vehicle. The degassing line may have, for example, a diameter of the order of 10 mm or less.

In the illustration in FIG. 1-2, it is assumed that the fluid flowing through the fluid line 1 flows at a higher shear rate or a higher flow pressure according to FIG. 2 than according to FIG. 1. The increasing shear forces in the dilatant fluid 20 which accompany this according to FIG. 2 lead to a structural change in the dilatant fluid 20 which, in turn, causes a reduction in the effective flow cross section (inside diameter) of the fluid line.

The variation in the flow resistance thus takes place completely automatically and without external control or the use of movable components.

In a further exemplary embodiment, the hollow body casing 10 may also be produced (partially or completely) from an electroactive polymer, in which case a variation in the flow resistance can be achieved likewise (and again without the need for movable components) by an electrical voltage being applied to the hollow body.

The hollow body casing may be produced from an electroactive polymer or the hollow body casing may have chambers filled with an electroactive polymer. An electroactive polymer (abbreviated: EAP) is understood in accordance with customary terminology to mean polymers in which the application of an electrical voltage causes a change in shape, which is why electroactive polymers are also designated as "artificial muscles".

Figure 3:
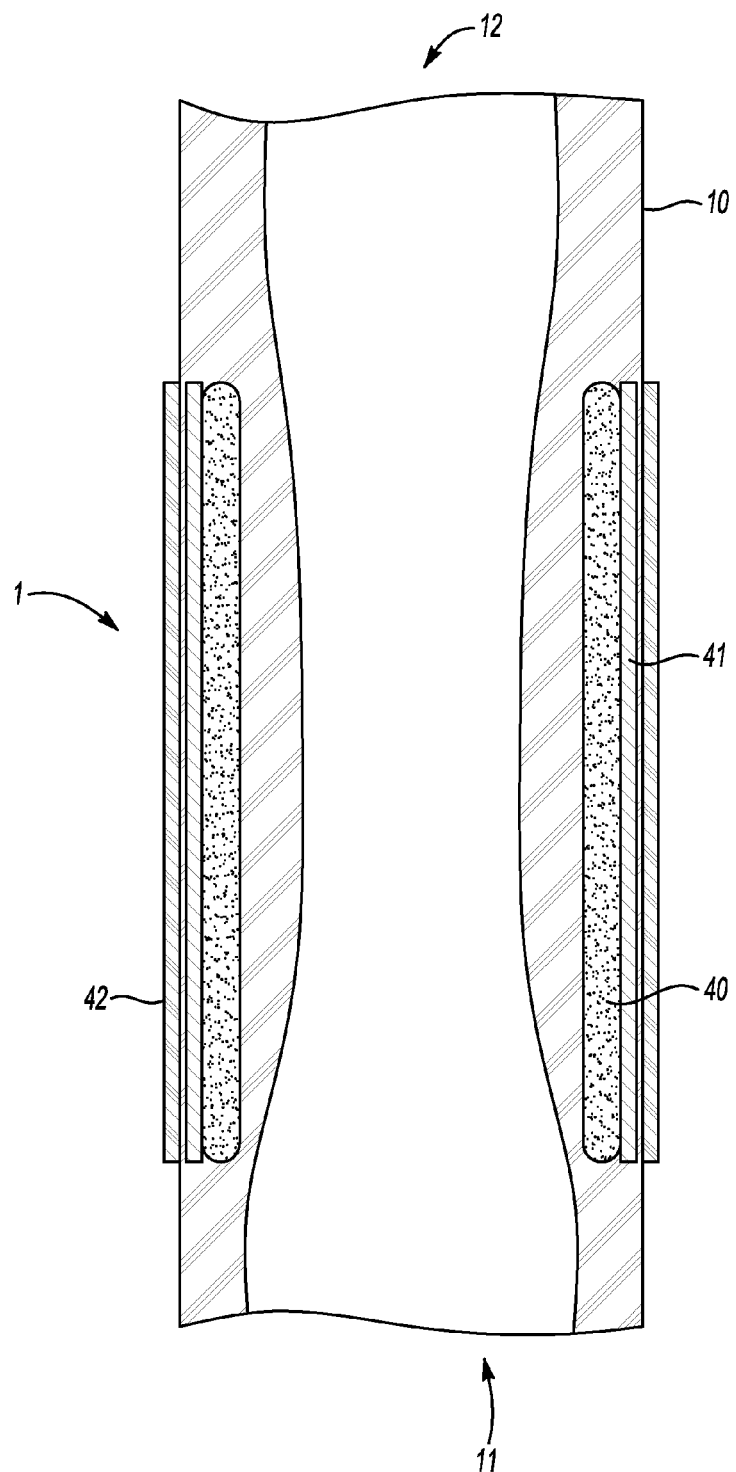
FIG. 3 shows a diagrammatic illustration of an embodiment with an electroactive polymer.

FIG. 3 shows, furthermore, an embodiment of the flow resistance with an electroactive polymer. In this case, the hollow body 10 has at least one chamber 30 which is filled with an electroactive polymer 40. What is shown, furthermore, is an electrically conductive connecting surface 41 which may be designed, for example, as a plate or plates or a ring. It may also be expedient to use a reinforcement 42 which prevents the hollow body from expanding outwardly and thus obstructing the desired flow reduction. This reinforcement 42, also, may be designed, for example, as a plate or plates or a ring.

Thus, in the embodiment of the hollow body casing made from an electroactive polymer, in contrast to the above-described embodiment with a dilatant fluid, it is necessary to have additional activation or an additional arrangement for applying an electrical voltage to the hollow body. However, in the same way as the above-described implementation with a dilatant fluid, the embodiment of the hollow body casing made from an electroactive polymer manages without any movable components, so that a variable flow resistance of comparatively low complexity and simple handling is obtained likewise as a result.

The inside diameters of degassing lines lie, as a rule, between 4 and 8 mm, while the flow restriction has a diameter of 2 to 3 mm. With suitable dimensioning of the EAP in relation to the inside diameter of the degassing line, embodiments may also be envisaged in which the through flow can be interrupted completely. The function of a valve would thereby be implemented.

According to the current prior art, ionic EAPs appear to be especially suitable. They are distinguished by a low control voltage of a few volts, along with high volume changes of up to 40%.

Ionic EAPs usually contain an aqueous electrolyte and have to be protected against drying out. It is therefore necessary to ensure that the at least one chamber hermetically closes off the EAP and also the conductive connecting surface outwardly and inwardly, in order to prevent the EAP from drying out.

In summary, an automatic variable flow resistance is implemented by suitable configuration of the hollow body casing, while in particular (although merely by a way of example) in a degassing line of a cooling system for an internal combustion engine, complex control mechanisms may be dispensed with.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A variable flow resistance conduit comprising:
   a fluid line having an elongate, hollow body casing having a sealed chamber containing a dilatant fluid exhibiting a volume increase under increasing pressure, the volume increase causing a reduction in an effective flow cross section of the fluid line in reaction to an increase in the shear rate of a fluid flowing through the fluid line.

2. The conduit of claim 1 wherein the dilatant fluid is configured such that the flow of the fluid can be interrupted completely.

3. The conduit of claim 1 wherein the conduit is configured for use as a degassing line in a cooling system of an internal combustion engine.

4. A degassing line for a cooling system of an internal combustion engine, comprising:
   a fluid line having an elongate, hollow body casing having a sealed chamber containing a dilatant fluid exhibiting a volume increase under increasing pressure, the volume increase causing a reduction in an effective flow cross section of the fluid line in reaction to an increase in the shear rate of a fluid flowing through the fluid line.

5. The degassing line of claim 4 wherein the dilatant fluid is configured such that the flow of the fluid can be interrupted completely.

* * * * *